United States Patent
Schaaff

(10) Patent No.: US 9,447,910 B2
(45) Date of Patent: Sep. 20, 2016

(54) TEMPORARY NIGHT PIPE CAP

(71) Applicant: Michael J. Schaaff, Manalapan, NJ (US)

(72) Inventor: Michael J. Schaaff, Manalapan, NJ (US)

(*) Notice: Subject to any disclaimer, the term of this patent is extended or adjusted under 35 U.S.C. 154(b) by 82 days.

(21) Appl. No.: 14/585,587

(22) Filed: Dec. 30, 2014

(65) Prior Publication Data

US 2016/0053931 A1 Feb. 25, 2016

Related U.S. Application Data

(60) Provisional application No. 62/039,624, filed on Aug. 20, 2014.

(51) Int. Cl.
| | |
|---|---|
| *F16L 55/10* | (2006.01) |
| *F16L 55/115* | (2006.01) |
| *E03B 7/07* | (2006.01) |
| *F16L 55/11* | (2006.01) |

(52) U.S. Cl.
CPC ............ *F16L 55/1157* (2013.01); *E03B 7/07* (2013.01); *F16L 55/1108* (2013.01)

(58) Field of Classification Search
CPC .............. F16L 55/115; F16L 55/1152; F16L 55/1157; F16L 55/1108
USPC ............................................. 138/89, 90, 109
See application file for complete search history.

(56) References Cited

U.S. PATENT DOCUMENTS

| | | | |
|---|---|---|---|
| 2005/0011567 A1* | 1/2005 | Li | F16L 55/11 138/96 R |
| 2010/0154988 A1* | 6/2010 | Richardson | F16K 17/383 156/273.9 |
| 2010/0206416 A1* | 8/2010 | Carson | F16L 55/11 138/89 |

* cited by examiner

*Primary Examiner* — Patrick F Brinson
(74) *Attorney, Agent, or Firm* — Richard Malagiere, Esq.

(57) ABSTRACT

A temporary night pipe cap is disclosed. The pipe cap has a gasket, a plate, a pressure relief valve and a plurality of high pressure clamps. The system is removably installed over a water pipe opening at street level or in the ground so that water pressure can be restored for the time period when work on the water pipe ends for the day.

3 Claims, 5 Drawing Sheets

TEMPORARY NIGHT PIPE CAP

PRIORITY CLAIM

This application claims priority to United States Provisional Application No. 62/039,624 Filed Aug. 20, 2014. The disclosure therein is incorporated herein by reference.

BACKGROUND OF THE INVENTION

The present invention is directed to the field of water main piping. In particular, it is directed to a temporary containment cap that can be placed on a water pipe so that water service can flow through the pipe.

When repairs are required to a water main, the water service through the pipe must be stopped. In certain municipalities, it is required that the water service be restored through the main each day when the repair crew stops work for the day. The process of returning service to the water main each day can be a time consuming and potentially dangerous activity. As the water begins to flow through the pipe, air in the pipe is displaced and can be compressed to a very high pressure by the water.

The present invention is directed to a high pressure temporary cap for the water main. The present invention is adapted to be connected to the water main at street level or below ground prior to the water service being returned to the main. The device securely clamps to the water pipe at street level, retains the water pressure and comprises a pressure relief valve to expel the excess air pressure. The purpose of the invention is to minimize the time that men are present in the ground to maximize safety for all workers. Also, due to the infrastructure of the installation of the city water mains, this device can restore water service and supply fire protection in case of emergency or any disaster within 3 minutes.

DETAILED DESCRIPTION OF THE PRESENT INVENTION

The present invention will now be described in terms of the presently preferred embodiment thereof. Those of ordinary skill in the art will recognize that many modifications may be made thereto without departing from the spirit or scope of the present invention.

Figure 1:
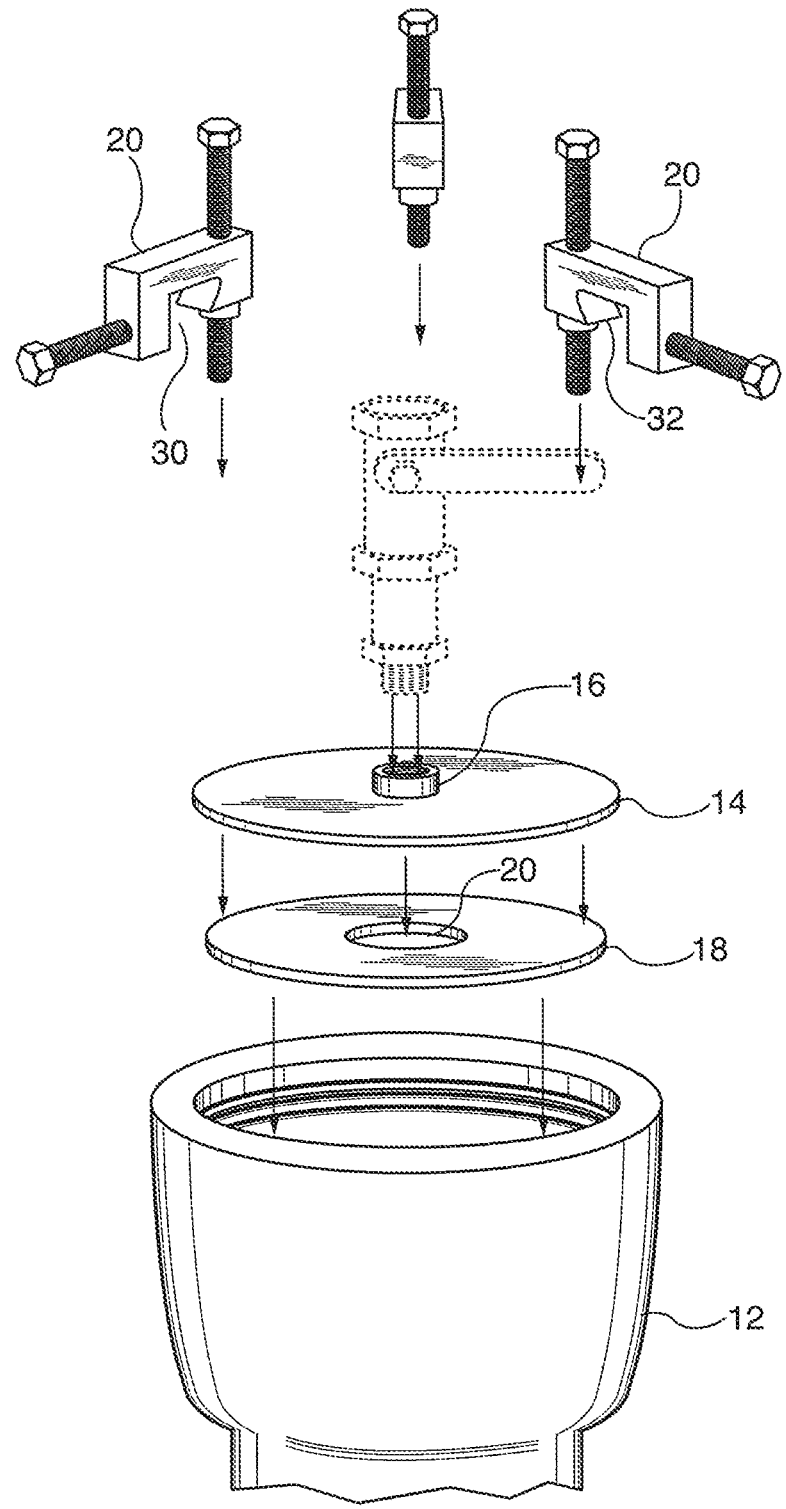
FIG. 1 is an exploded perspective view of the present invention.
Figure 2:
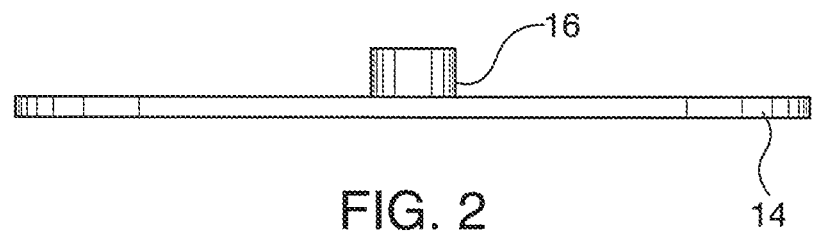
FIG. 2 is a side elevation view of a component of the present invention.
Figure 3:
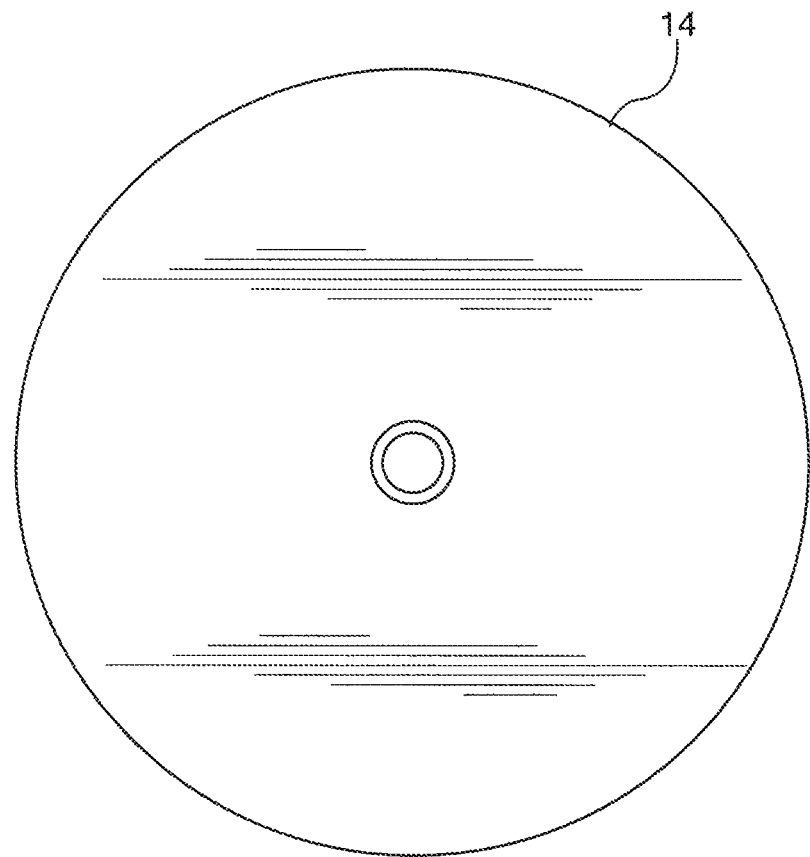
FIG. 3 is a top elevation of the component illustrated in FIG. 2.
Figure 4:
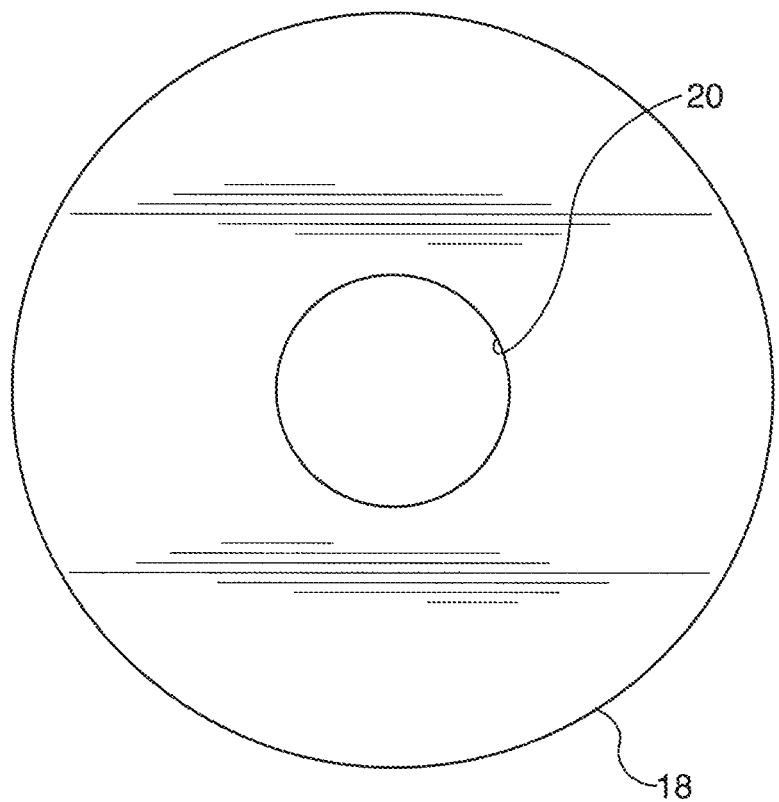
FIG. 4 is a top elevation view of a component of the present invention.
Figure 5:
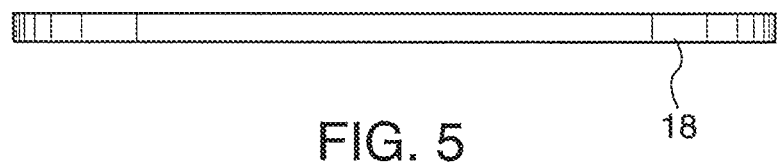
FIG. 5 is a side elevation view of the component illustrated in FIG. 4.
Figure 6:
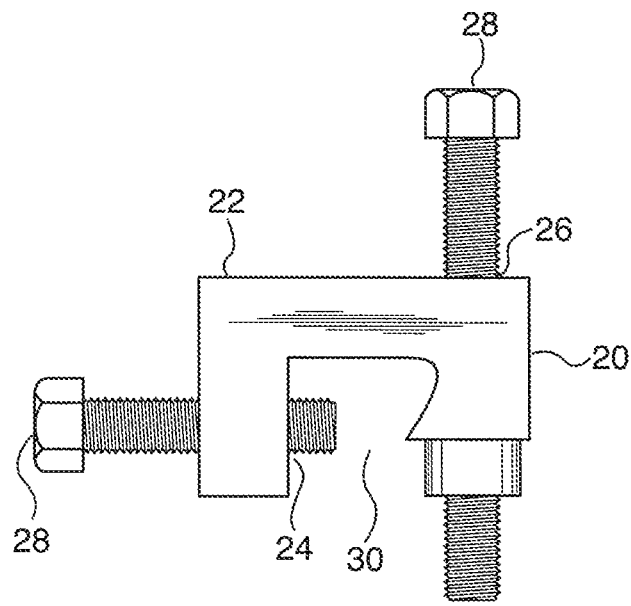
FIG. 6 is a side elevation view of a component of the present invention.
Figure 7:
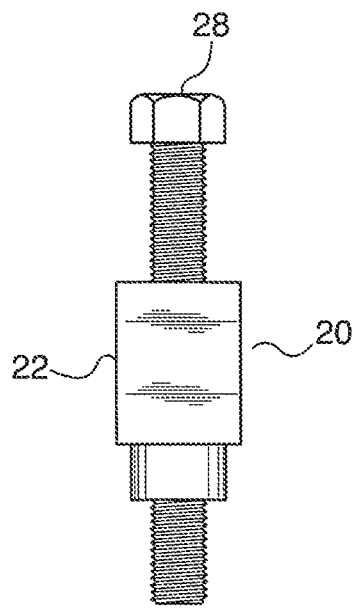
FIG. 7 is a second side elevation view of the component illustrated in FIG. 6.

The pipe cap 10 as of the present invention is adapted to be installed on the top of a water main 12 at street level or below the ground. The cap 10 comprises a circular metal plate 14. The metal plate 14 is contemplated to be fabricated from steel though other equivalent materials may be utilized. The metal plate 14 comprises a threaded projection 16 containing internal threads 15. The threaded projection 16 is adapted to receive an air-pressure relief device such as a ball valve as illustrated in FIG. 1. Other available valves can be used and are well known to those of ordinary skill in the art.

The cap 10 further comprises a circular gasket 18. The gasket 18 comprises a center through-hole 20 and is approximately the same diameter as the circular metal plate 14. It is contemplated that the gasket will be fabricated from EPDM with a durometer of 60 +/−5.

The cap 10 further comprises a plurality of clamps 20. The clamps 20 each comprise a body 22. The body 22 is fabricated from steel although other equivalent materials may be substituted. The body comprises two threaded holes 24 and 26 oriented perpendicular to each other. The threaded holes 24 and 26 are each adapted to receive a threaded bolt 28. The body 22 further comprises an opening 30 on its bottom side. The opening 30 further comprises a gripping surface 32.

Figure 8:
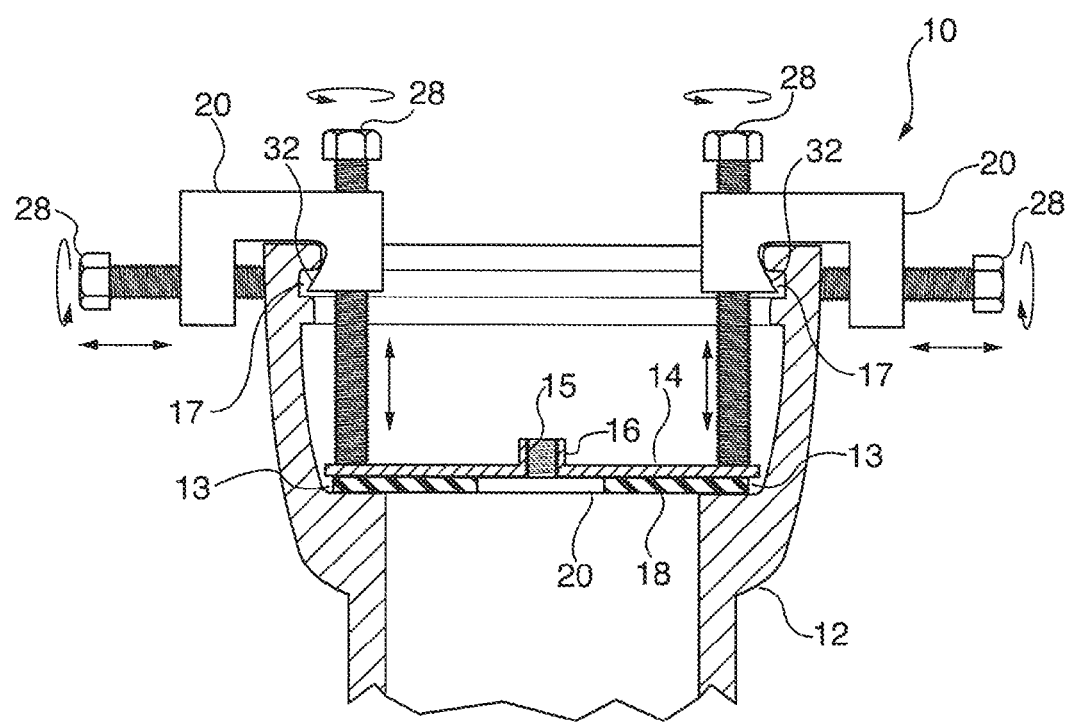
FIG. 8 is a side cross-section of the present invention installed on a water pipe.

The installation of the pipe cap 10 onto a water pipe 12 is illustrated in detail in FIG. 8. As shown in FIG. 8, the water pipe 12 comprises a shoulder surface 13 and a notch 17. The gasket 18 is placed on the shoulder surface 13. The circular metal plate 14 is then placed on top of the gasket 18. The openings 30 on the plurality of clamps 20 are placed around the circumference of the water pipe 12 at the street level. The gripping surface 32 on each clamp 20 engages the notch 17 of the water pipe 12. In this orientation, one of the bolts 28 is oriented vertically and engages the top surface of the metal plate 14, The other bolt 28 is oriented horizontally and engages the side of the water pipe 12 either at street level or below the ground. Both of the bolts 28 on each clamp 20 are then tightened securely. When properly tightened, the pipe cap 10 is held securely in place over the top opening of the water pipe 12.

After the cap 10 is secured in place over the water pipe 12, the water service can be restored in the water main. As the water starts to flow, air pressure will build up in the water main. The air pressure can be relieved through the pressure relief valve mounted in the threaded opening 15. The arrangement of the gasket 18 at the metal plate forms a water tight seal at notch 15 on the water pipe 12 and can hold the water therein at normal operating pressures.

Those of ordinary skill in the art will recognize that many obvious modifications may be made thereto without departing from the spirit or scope of the present invention as set forth in the appended claims.

What is claimed is:

1. A temporary night pipe cap for a water main pipe so that water service can be restored during times when repairs to the water main are temporarily stopped comprising:
   a) A gasket adapted to be placed onto a shoulder surface of an opening in the water main;
   b) A metal plate with an upper surface and a lower surface and comprising a projection from the upper surface adapted to operably receive a pressure relief valve; and
   c) A plurality of clamps for securing the temporary night cap to the opening in the water main;
      wherein the gasket is placed on the shoulder surface of the water pipe, the lower surface of the metal plate is placed on top of the gasket and the plurality of clamps secure the temporary night cap to a notch in the opening of the water main.

2. The temporary night cap of claim 1 wherein the metal plate and the gasket are generally circular in shape.

3. The temporary night cap of Claim I wherein the plurality of clamps comprise a block with a flat gripping surface adapted to engage the notch, first and second threaded openings oriented generally perpendicular to each other which receive first and second threaded bolts, wherein the first threaded bolt engages the upper surface of the metal plate and the second threaded bolt engages an outside surface of the opening in the water main and the first threaded bolt and second threaded bolt are tightened so that the temporary night pipe cap is sealed to the opening in the water main and securely maintains its position as the water main pipe is pressurized by restoration of the water service therein.

\* \* \* \* \*